United States Patent
Natarajan (10) Patent No.: US 9,577,998 B2
(45) Date of Patent: Feb. 21, 2017

(54) DYNAMIC FILE ACCESS TO FILES OF UNMAPPED REMOTE COMPUTERS

(75) Inventor: Murali Natarajan, Schaumburg, IL (US)

(73) Assignee: International Business Machines Corporation, Armonk, NY (US)

(*) Notice: Subject to any disclaimer, the term of this patent is extended or adjusted under 35 U.S.C. 154(b) by 1210 days.

(21) Appl. No.: 12/336,887

(22) Filed: Dec. 17, 2008

(65) Prior Publication Data

US 2010/0154038 A1 Jun. 17, 2010

(51) Int. Cl.

| | |
|---|---|
| G06F 17/30 | (2006.01) |
| G06F 21/00 | (2013.01) |
| H04L 9/32 | (2006.01) |
| H04L 29/06 | (2006.01) |
| G06F 21/62 | (2013.01) |
| H04L 29/08 | (2006.01) |

(52) U.S. Cl.
CPC ............ *H04L 63/08* (2013.01); *G06F 21/62* (2013.01); *H04L 67/2842* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,216,153 B1* | 4/2001 | Vortriede | 709/203 |
| 7,136,903 B1* | 11/2006 | Phillips et al. | 709/217 |
| 7,185,364 B2* | 2/2007 | Knouse et al. | 726/8 |
| 7,284,232 B1* | 10/2007 | Bates et al. | 717/100 |
| 8,074,259 B1* | 12/2011 | Levy et al. | 726/2 |
| 2002/0070968 A1* | 6/2002 | Austin et al. | 345/764 |
| 2003/0080994 A1* | 5/2003 | Yepishin et al. | 345/738 |
| 2003/0084045 A1 | 5/2003 | Anderson et al. | |
| 2003/0191761 A1 | 10/2003 | Bauer | |
| 2009/0064279 A1* | 3/2009 | Ardolino | 726/3 |

* cited by examiner

*Primary Examiner* — Fatoumata Traore
(74) *Attorney, Agent, or Firm* — Brandon C. Kennedy; John R. Pivnichny; Kennedy Lenart Spraggins LLP (57) ABSTRACT

Dynamically providing access to files of presently unmapped remote computers, including, responsive to receiving a file access request from a user, displaying a file access Graphical User Interface ('GUI') dialog box; receiving, from the user through the file access GUI dialog box, a Uniform Resource Locator ('URL') representing a file location on a remote computer, wherein the URL specifies a particular access protocol among a number of available access protocols, a network location of the remote computer, a port number, and a file system path; and accessing, in dependence upon the URL, a file on the remote computer at the file system path through data communications established between a local server module and a remote server running on the remote computer using the particular access protocol, the network location of the remote computer, and the port number.

20 Claims, 7 Drawing Sheets

DYNAMIC FILE ACCESS TO FILES OF UNMAPPED REMOTE COMPUTERS

BACKGROUND OF THE INVENTION

Field of the Invention

The field of the invention is data processing, or, more specifically, methods, apparatus, and products for dynamically providing access to files of presently unmapped remote computers.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computers today are often organized in data communications networks, local and wide area, are connected to the Internet, and are otherwise connected through a data communications network to many other computers. File access within most user level applications, however, is limited to the files stored in a computer's local file systems. A user may open and save files within the local file system. Presently a user is able to access files stored on a remote computer through a user level application only if that remote computer is mapped to the local computer. In such a case, the remote computer appears to the user as if it were a local drive. There is at present no way to dynamically access files of a remote computer that is presently not mapped to a local computer.

SUMMARY OF THE INVENTION

Disclosed in this specification are computer-implemented methods, apparatus, and products for dynamically providing access to files of presently unmapped remote computers, including, responsive to receiving a file access request from a user, displaying a file access Graphical User Interface ('GUI') dialog box; receiving, from the user through the file access GUI dialog box, a Uniform Resource Locator ('URL') representing a file location on a remote computer, wherein the URL specifies a particular access protocol among a number of available access protocols, a network location of the remote computer, a port number, and a file system path; and accessing, in dependence upon the URL, a file on the remote computer at the file system path through data communications established between a local server module and a remote server running on the remote computer using the particular access protocol, the network location of the remote computer, and the port number.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
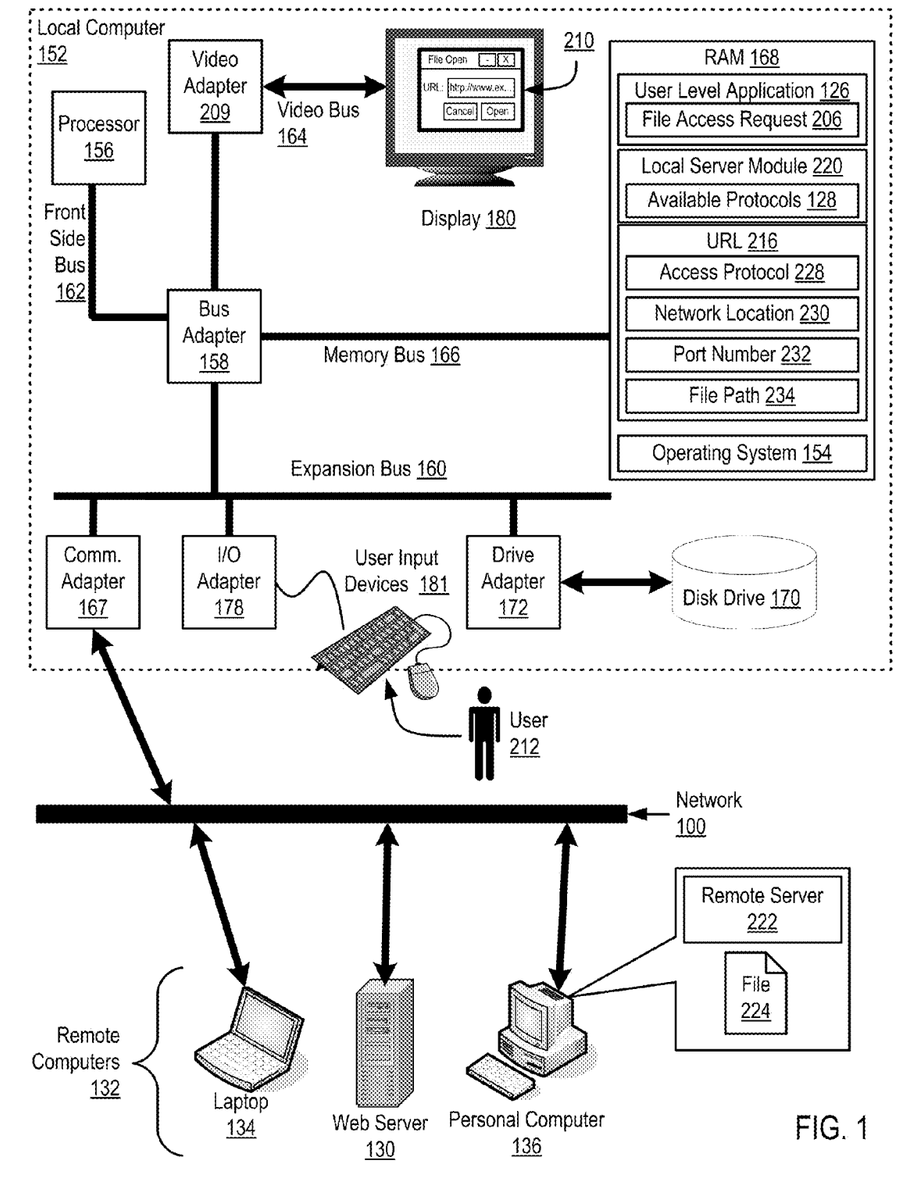
FIG. 1 sets forth a network diagram of an exemplary system for dynamically providing access to files of presently unmapped remote computers according to embodiments of the present invention.

Exemplary methods, apparatus, and products for dynamically providing access to files of presently unmapped remote computers in accordance with the present invention are described with reference to the accompanying drawings, beginning with FIG. 1. FIG. 1 sets forth a network diagram of an exemplary system for dynamically providing access to files of presently unmapped remote computers according to embodiments of the present invention.

The system of FIG. 1 includes a local computer (152) which in turn includes at least one computer processor (156) or 'CPU' as well as random access memory (168) ('RAM') which is connected through a high speed memory bus (166) and bus adapter (158) to processor (156) and to other components of the computer (152). The term 'local' is used here to describe a computer, that, from the point of view of the user is not remotely accessed, that is, a computer not accessed by the user (212) through a data communications network (100) but rather through I/O devices connected to the computer's I/O adapter. The system of FIG. 1 also includes several example remote computers (132), that is, remote from the point of view of the user (212) in that the computers (132) must be accessed by the user through the data communications network (100). The example remote computers (132) of FIG. 1 include a laptop (134), web server (130), and personal computer (136). Readers of skill in the art will immediately recognize these computers only but a few examples of automated computing machinery comprising a remote computer and that there are many other forms of automated computing machinery which may operate as a remote computer according to embodiments of the present invention.

As mentioned above the system of FIG. 1 operates for dynamically providing access to files of presently unmapped remote computers according to embodiments of the present invention. Drive mapping is the method by which Microsoft Windows, IBM's OS/2, and other operating systems, associate a shared storage area of a remote computer as if the storage area were a local hard disk drive. When mapped, a software application on a local computer is capable of reading and writing files from the shared storage area by accessing that drive just as if that drive represented a local physical hard disk drive. According to embodiments of the present invention such drive mapping is unnecessary in order for an application to provide access to files on remote computer. Instead, access to files on remote computers is provided dynamically, without drive mapping.

Stored in RAM (168) of the computer (152) is a user level application (126), a module of computer program instructions that carries out user level data processing tasks. Examples of such user level applications that carry out user level data processing tasks include, word processing applications, spreadsheet applications, presentation development applications, audio recording and editing applications, video recording and editing applications, digital image processing applications, and so on as will occur to readers of skill in the art. Examples of word processing applications capable of being improved for dynamic remote file access according to embodiments of the present invention include Microsoft Word, Apple's Pages, Corel WordPerfect, Lotus Word Pro, and so on as will occur to readers of skill in the art. Examples of spreadsheet applications capable of being improved for dynamic remote file access according to embodiments of the present invention include Microsoft Excel, Apple's Numbers, Corel Quattro Pro, Lotus 1-2-3, and so on as will occur to readers of skill in the art. Examples of presentation development applications capable of being improved for dynamic remote file access according to embodiments of the present invention include Microsoft PowerPoint, Apple's Keynote presentation software, Lotus Symphony and so on as will occur to readers of skill in the art.

The user level application (126) in the example of FIG. 1, in addition to carrying out user level data processing tasks, is also configured for dynamically providing access to files of presently unmapped remote computers according to embodiments of the present invention. The application (126) may dynamically provide access to files of presently unmapped remote computers by: displaying a file access Graphical User Interface ('GUI') dialog box (210) in response to receiving a file access request (206) from a user (212); receiving, from the user (212) through the file access GUI dialog box (210), a Uniform Resource Locator ('URL') (216) representing a file location (226) on a remote computer (202), where the URL (216) specifies a particular access protocol (228) among a plurality of available access protocols, a network location (230) of the remote computer (202), a port number (232), and a file system path (234); and accessing, in dependence upon the URL (216), a file (224) on the remote computer (202) at the file system path (234) through data communications established between a local server module (220) and a remote server (222) running on the remote computer (202) using the particular access protocol (228), the network location (230) of the remote computer (202), and the port number (232).

A file access request (206) is a request to access—save or open—a file in a file system, that is, a request to write data to computer memory, a disk drive for example, in the form of a file, or a request to copy data into computer memory, such as RAM (168), from a disk drive or similar storage.

A file access GUI dialog box (210) is a GUI dialog box displayed when a user requests access to a file. The GUI dialog box (210) enables a user, through GUI component such as text boxes, drop down lists, buttons, and the like, to specify a filename and file location of a file to access. The file location specified by a user according to embodiments of the present invention is specified with a URL (216) that includes a particular access protocol (228) among a plurality of available access protocols. An access protocol is a data communications protocol typically associated with application layer of the seven layer OSI (Open Systems Interconnection Basic Reference Model) model and the TCP/IP (Transmission Control Protocol/Internet Protocol') model. Examples of access protocols include HTTP (HyperText Transfer Protocol), HTTPS (HTTP over Secure Socket Later), POP (Post Office Protocol), SIP (Session Initiation Protocol), SMTP (Simple Mail Transfer Protocol), SOAP (Simple Object Access Protocol), SSH (Secure Shell), FTP (File Transfer Protocol), and so on as will occur to readers of skill in the art. Dynamically providing access to files of presently unmapped remote computers in accordance with embodiments of the present invention is not limited to one access protocol. Some file transfer applications of the prior art, providing only file transfer operations and nothing more, are limited to only one access protocol. FTP clients, for example, are limited to only the FTP access protocol. Here, by contrast, a user may specify one of many available access protocols and the user level application provides user level data processing tasks in addition to mere file transfer.

The URL (216) in the example of FIG. 1 also includes a network location (230) of the remote computer (202). A network location is data identifying a computer's location on a network. Such a network location may be an Internet Protocol address, a computer name of a computer in a local area network, a domain name, and so on as will occur to readers of skill in the art.

The URL (216) in the example of FIG. 1 also includes a port number (232). A port number (232) represents an endpoint or 'channel' for network communications. Port numbers enable different applications on the same computer to utilize network resources without interfering with each other.

The URL (216) in the example of FIG. 1 also includes file system path (234). A file system path is a general form of a file or directory name, specifying a unique location in a file system. A path points to a file system location by following the directory tree hierarchy expressed in a string of characters in which path components, separated by a delimiting character, represent each directory. The delimiting character is most commonly the slash ("/"), the backslash character ("\"), or colon (":"), though some operating systems may use a different delimiter. Paths are used extensively in computer science to represent the directory and file relationships common in modern operating systems. A path may be absolute or relative. A full path or absolute path is a path that points to the same location on one file system regardless of the working directory or combined paths. It is usually written in reference to a root directory. A relative path is a path relative to the working directory of the user or application, so the full absolute path need not be given.

Accessing a file on the remote computer according to embodiments of the present invention is carried out with a local server module executing, or 'running,' on the local computer (152) and a remote server (222) running on the remote computer (132). The local server module and the remote server (222) are data communications servers, modules of computer program instructions that provide data communications services to other computer program programs running on the same or other computers. Here, for example, the remote server (222) provides data communications services to the local server module (220) and thereby provides data communications services to the user level application (126) that directs the local server module's (220) operations. In the example of FIG. 1, the local server module (220) is depicted as a standalone software component for ease of explanation only, not limitation. Readers of skill in the art will immediately recognize that local server modules (220) useful in systems that dynamically provide access to files of presently unmapped remote computers according to embodiments of the present invention may be implemented as a software component of an operating system (154) exposing one or more Application Programming Interfaces ('APIs') to the user level application (126) for directing data communications between the local and remote servers, or may be implemented as a software component of the user level application (126) itself, that is, coded directly in the application.

File access provided according to embodiments of the present invention may be transparent to the user (212) after a remote file (224) is accessed, that is, once a file is opened on the local computer or saved on the remote computer. The user level application may direct the local server module (220) to maintain the established data communications with the remote server after the file is opened or saved or may store the URL for later use. Consider, for example, that the user level application (126) is a word processing application and a user opens the file (224) stored on the personal computer (136). Opening the file includes retrieving a copy of the file on the local computer. A user then may modify the local file, and through a keyboard or icon shortcut, direct the user level application to save the file. Instead of requesting the URL again, the user level application may use the previously received URL, transparently to the user, to send the modified version of the document to the remote computer for storage. To the user, the file is saved as if saved on a local hard disk drive.

Consider, as a further example of file access provided according to embodiments of the present invention, that the user (212) opens a remote file (224) stored on the personal computer (136). That is, the user level application (126) through one or more data communications protocols, using a file path, port, and network location provided by a user, retrieves the file (224) from the personal computer (136) and stores the file (224) in local RAM (168) where the file is modified by the user (212) through the user level application (126). The user (212) may, In some embodiments of the present invention, may, in addition to saving the modified file (224) back to computer storage on the personal computer (136), may save the modified file (224) on another remote computer (132), say the laptop (134), for example, in the same manner described above for saving a file to any remote computer. The user therefore may effectively transfer a file (224) from one remote computer to another remote computer, including modifying the file (224) en route, through functionality provided by user level applications (126) that provide file access according to embodiments of the present invention. Readers of skill in the art will recognize that a user, through a user level application (126) may save a file, 'opened' or retrieved from one remote computer, to another remote computer by using a file access request similar to the well known 'Save As' file access request that allows a user to store a copy of the opened file, in its current state, in a user specified directory, here a directory on another remote computer, with a user specified name.

Also stored in RAM (168) is an operating system (154). Operating systems useful for dynamically providing access to files of presently unmapped remote computers according to embodiments of the present invention include UNIX™, Linux™, Microsoft XP™, AIX™, IBM's i5/OS™, and others as will occur to those of skill in the art. The operating system (154), user level application (126), local server module (220), available protocols (128), URL (216), and so on in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that dynamically provide access to files of presently unmapped remote computers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other remote computers (132), such as the personal computer (136), web server (130), and laptop (134), and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically providing access to files of presently unmapped remote computers according to embodiments of the present invention include modems for wired dial-up communications, Ethernet (IEEE 802.3) adapters for wired data communications network communications, and 802.11 adapters for wireless data communications network communications.

The arrangement of local computer (152), remote computer (132), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
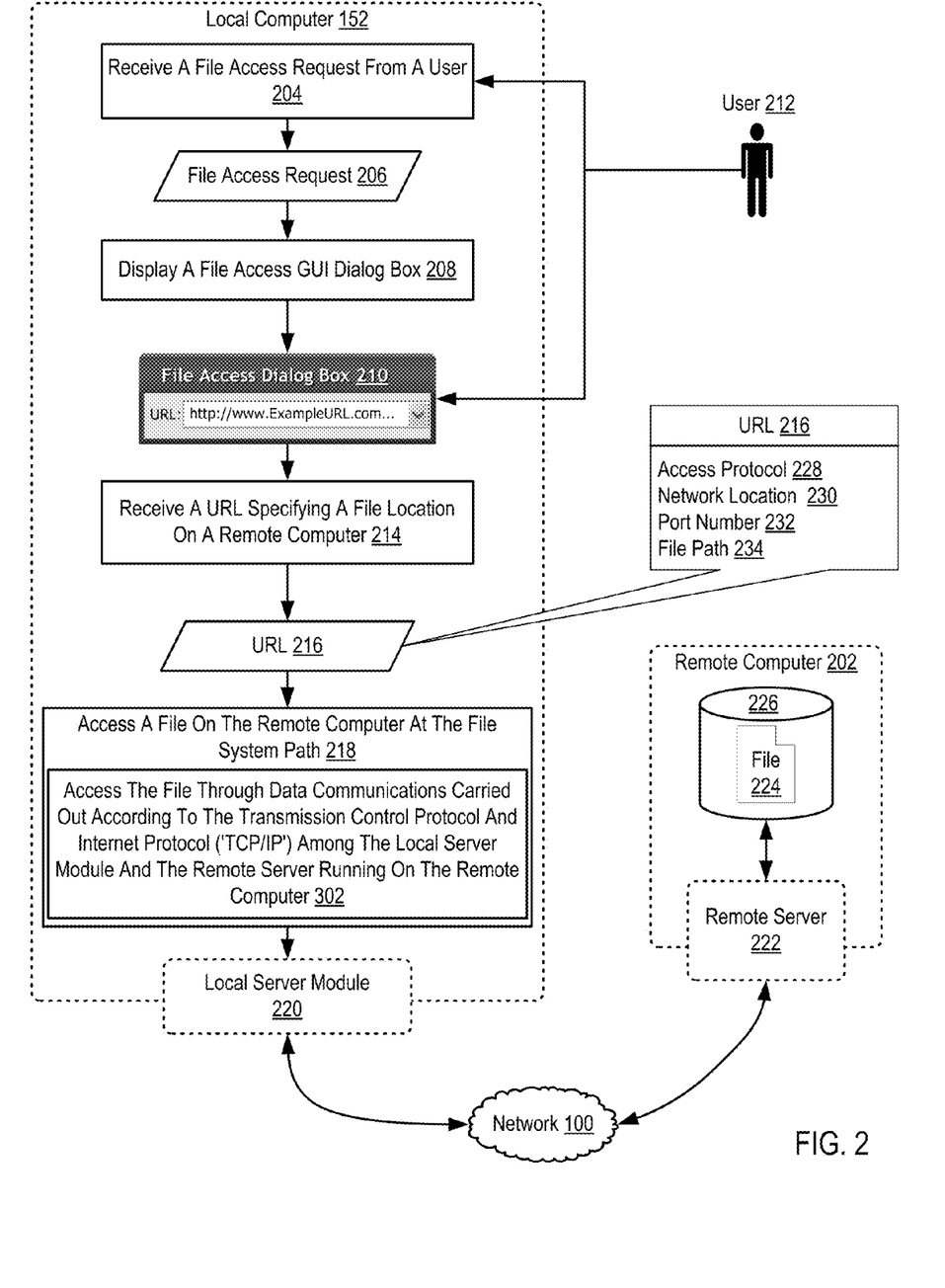
FIG. 2 sets forth a flow chart illustrating an exemplary method for dynamically providing access to files of presently unmapped remote computers according to embodiments of the present invention.

For further explanation, FIG. 2 sets forth a flow chart illustrating an exemplary method for dynamically providing access to files of presently unmapped remote computers according to embodiments of the present invention. Responsive to receiving (204) a file access request (206) from a user (212), the method of FIG. 2 includes displaying (208) a file access Graphical User Interface ('GUI') dialog box (210). Displaying (208) a file access Graphical User Interface ('GUI') dialog box (210) may be carried out by rendering the GUI box on a display (180 on FIG. 1) connected to a video adapter (209 on FIG. 1) of the local computer (152 on FIG. 1).

The method of FIG. 2 also includes receiving (214), from the user (212) through the file access GUI dialog box (210), a Uniform Resource Locator ('URL') (216) specifying a file location (226) on a remote computer (202). In the method of FIG. 2, the URL (216) specifies a particular access protocol (228) among a plurality of available access protocols, a network location (230) of the remote computer (202), a port number (232), and a file system path (234). Receiving (214) a URL (216) specifying a file location (226) on a remote computer (202) may be carried out by receiving data entered into fields of the GUI dialog box, data selected from drop down menu lists of the GUI dialog box, data represented GUI buttons of the dialog box, and by other types of user interface actions as will occur to readers of skill in the art.

The method of FIG. 2 also includes accessing (218), in dependence upon the URL (216), a file (224) on the remote computer (202) at the file system path (234) through data communications established between a local server module (220) and a remote server (222) running on the remote computer (202) using the particular access protocol (228), the network location (230) of the remote computer (202), and the port number (232). In the method of FIG. 2, accessing (218), in dependence upon the URL (216), a file (224) on the remote computer (202) is carried out by accessing (302) the file through data communications carried out according to the Transmission Control Protocol and Internet Protocol ('TCP/IP') among the local server module (220) and the remote server (222) running on the remote computer. That is the local server module may establish data communications with the remote server according to TCP with typical SYN, SYN-ACK messages, and the like, included as payload of packets configured as IP packets. Once established, such data communications may include messages configured according to particular access protocol (228), such as for example, HTTP Get and HTTP Send messages.

Figure 3:
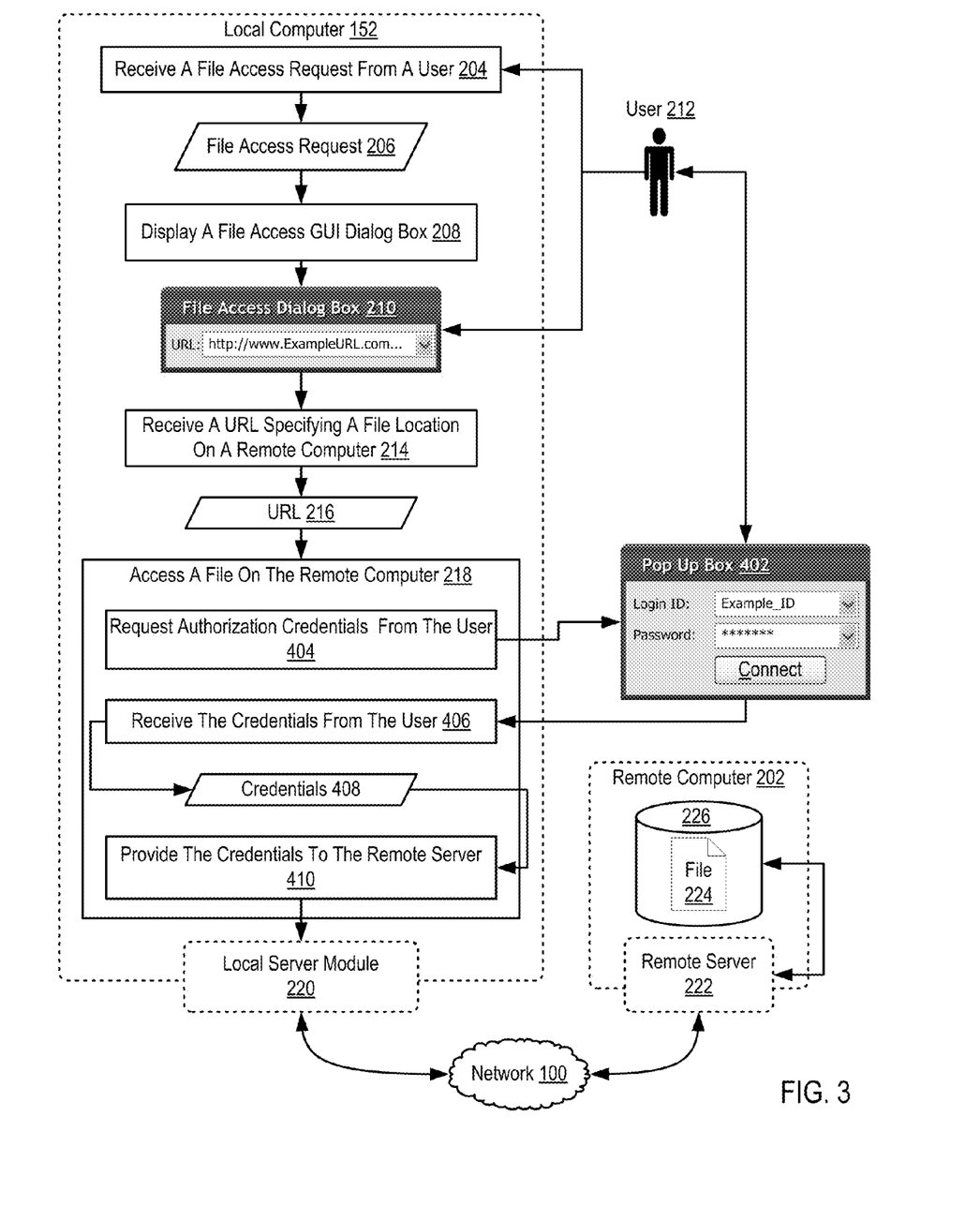
FIG. 3 sets forth a flow chart illustrating a further exemplary method for dynamically providing access to files of presently unmapped remote computers according to embodiments of the present invention.

For further explanation, FIG. 3 sets forth a flow chart illustrating a further exemplary method for dynamically providing access to files of presently unmapped remote computers according to embodiments of the present invention. The method of FIG. 3 is similar to the method of FIG. 2 in that the method of FIG. 3 includes displaying (208) a file access GUI dialog box (210); receiving (214), from the user (212) through the file access GUI dialog box (210), a URL (216) specifying a file location (226) on a remote computer (202); and accessing (218), in dependence upon the URL (216), a file (224) on the remote computer (202). The method of FIG. 3 differs from the method of FIG. 2, however in that in the method of FIG. 3, accessing (218) a file (224) on the remote computer (202) includes requesting (404), from the user (212), authorization credentials (408); receiving (406) the authorization credentials (408) from the user (212); and providing (410), by the local server module (220), the authorization credentials (408) to the remote server (222) running on the remote computer (202). Authorization credentials refer to data used to determine whether a particular requesting user is authorized to access a resource. Examples of such authorization credentials include a combination of username and password, login ID and pin, and so on as will occur to readers of skill in the art. Requesting (404) such authorization credentials (408) may be carried out by presenting to the user a GUI pop-up box (402) when attempting to establish data communications with the remote server and determining that the remote server requires authorization. Receiving (406) the authorization credentials (408) from the user (212) may be carried out by receiving data entered into one or more text fields of the GUI pop up box (402). That is, data entered into the text fields by the user represents the authorization credentials provided to the remote server. Providing (410) the authorization credentials (408) to the remote server (222) running on the remote computer (202) may be carried out by sending the authorization credentials in one or more data communications packets over the data communications network (100) to the remote server. Upon receiving the credentials, the remote server (222) may determine whether to grant access to the user in dependence upon the received credentials and send an approval or denial of access in response to the local server module in one or more data communications packets across the data communications network (100).

Figure 4:
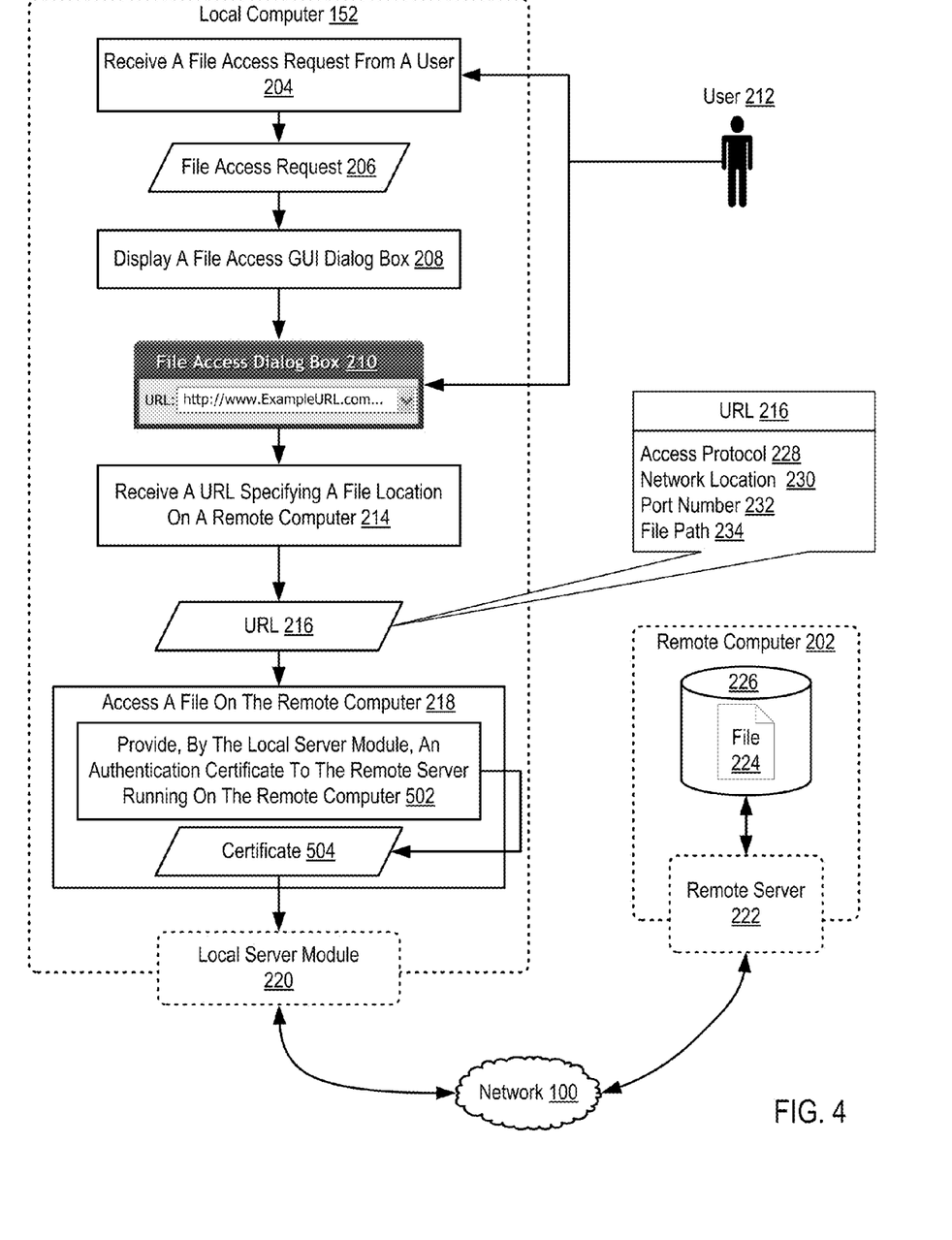
FIG. 4 sets forth a flow chart illustrating a further exemplary method for dynamically providing access to files of presently unmapped remote computers according to embodiments of the present invention.

For further explanation, FIG. 4 sets forth a flow chart illustrating a further exemplary method for dynamically providing access to files of presently unmapped remote computers according to embodiments of the present invention. The method of FIG. 4 is similar to the method of FIG. 2 in that the method of FIG. 4 includes displaying (208) a file access GUI dialog box (210); receiving (214), from the user (212) through the file access GUI dialog box (210), a URL (216) specifying a file location (226) on a remote computer (202); and accessing (218), in dependence upon the URL (216), a file (224) on the remote computer (202). The method of FIG. 4 differs from the method of FIG. 2, however in that in the method of FIG. 4, accessing (218) a file (224) on the remote computer (202) includes providing (502), by the local server module (220), an authentication certificate (504) to the remote server (222) running on the remote computer (202). An authentication certificate is data used to authenticate the identity of a user, an application, or the like. Authentication certificates may include public key certificate, such as a self signed, digital certificate and the like. Providing (502) an authentication certificate (504) to the remote server (222) running on the remote computer (202) may be carried out by providing the certificate in one or more data communications packets over the network (100) connecting the remote computer (202) and the local computer (152).

Figure 5:
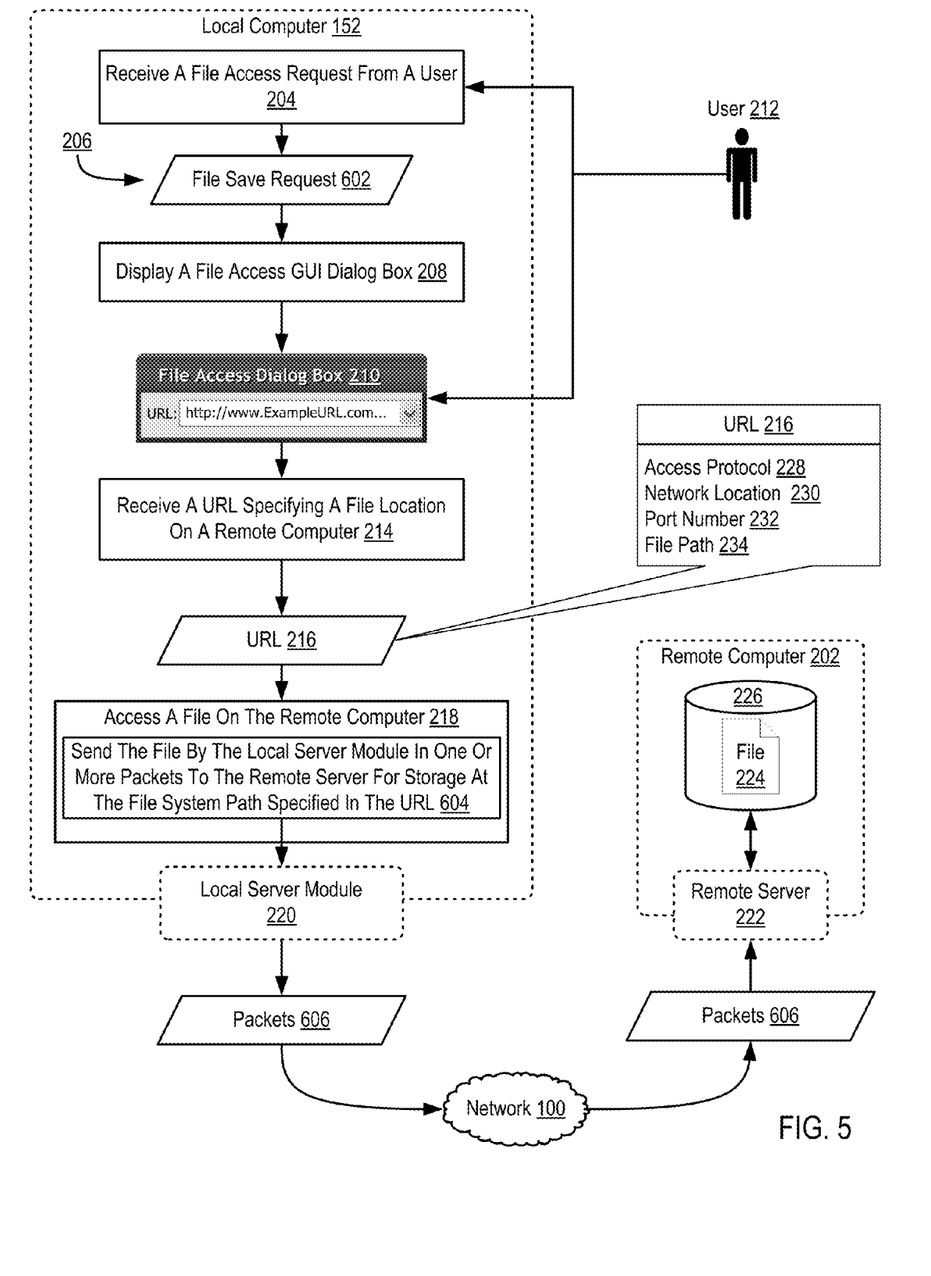
FIG. 5 sets forth a flow chart illustrating a further exemplary method for dynamically providing access to files of presently unmapped remote computers according to embodiments of the present invention.

For further explanation, FIG. 5 sets forth a flow chart illustrating a further exemplary method for dynamically providing access to files of presently unmapped remote computers according to embodiments of the present invention. The method of FIG. 5 is similar to the method of FIG. 2 in that the method of FIG. 5 includes displaying (208) a file access GUI dialog box (210); receiving (214), from the user (212) through the file access GUI dialog box (210), a URL (216) specifying a file location (226) on a remote computer (202); and accessing (218), in dependence upon the URL (216), a file (224) on the remote computer (202). The method of FIG. 5 differs from the method of FIG. 2, however, in that in the method of FIG. 5, the file access request (206) is a request (602) for access to save a file on the remote computer (202). Such a request may include a request to save the file, save the file with a particular name, save a copy of the file, save the file as a web page, and so on as will occur to readers of skill in the art. Also in the method of FIG. 5, accessing (218) a file (224) on the remote computer (202) includes sending (604) the file (224) by the local server module (220) in one or more data communications packets (606) to the remote server (222) running on the remote computer (202) for storage (226) at the file system path specified in the URL (216). The local server module (220), for example, may send the file in one or more IP packets where at least one packet has a header that includes the file path and a command to save, and the payload data of the packets comprises the file. A file path and a command to save in a header may be implemented for example as save: D:\ExampleFilePath\Filename.txt. This example file path, and those depicted in the Figures of this specification are example file paths implemented for the Microsoft Windows operating system. Readers of skill in the art will recognize, however, that other forms of file paths may be used in accordance with embodiments of the present invention and such forms depend entirely on the operating system managing the file system for which the file path is specified. Linux, Unix, and the like, for example, use file paths of a different form than that used in Microsoft Windows operating systems. Readers of skill in the art will also recognize that the form of the file path is not necessarily dependent upon the operating system running on the local computer, but rather dependent upon the operating system running on the remote computer. Consider, for example, that a local computer runs a Microsoft Windows operating system while a remote computer runs a Unix-based operating system. The path specified in the URL included in the data communications packets (706) may be specified in the form required by Unix-based operating systems because the path is only data in data communications packets until received by the remote server (222) of the remote computer and because the path is not used directly by any software running in the Windows operating system. Once the packets are received, the remote server (222) is capable of using the Unix-based file path to retrieve the file from computer memory (226), computer memory organized in a Unix-based file system, packetize the file, and send the packets back to the local server module (220).

Figure 6:
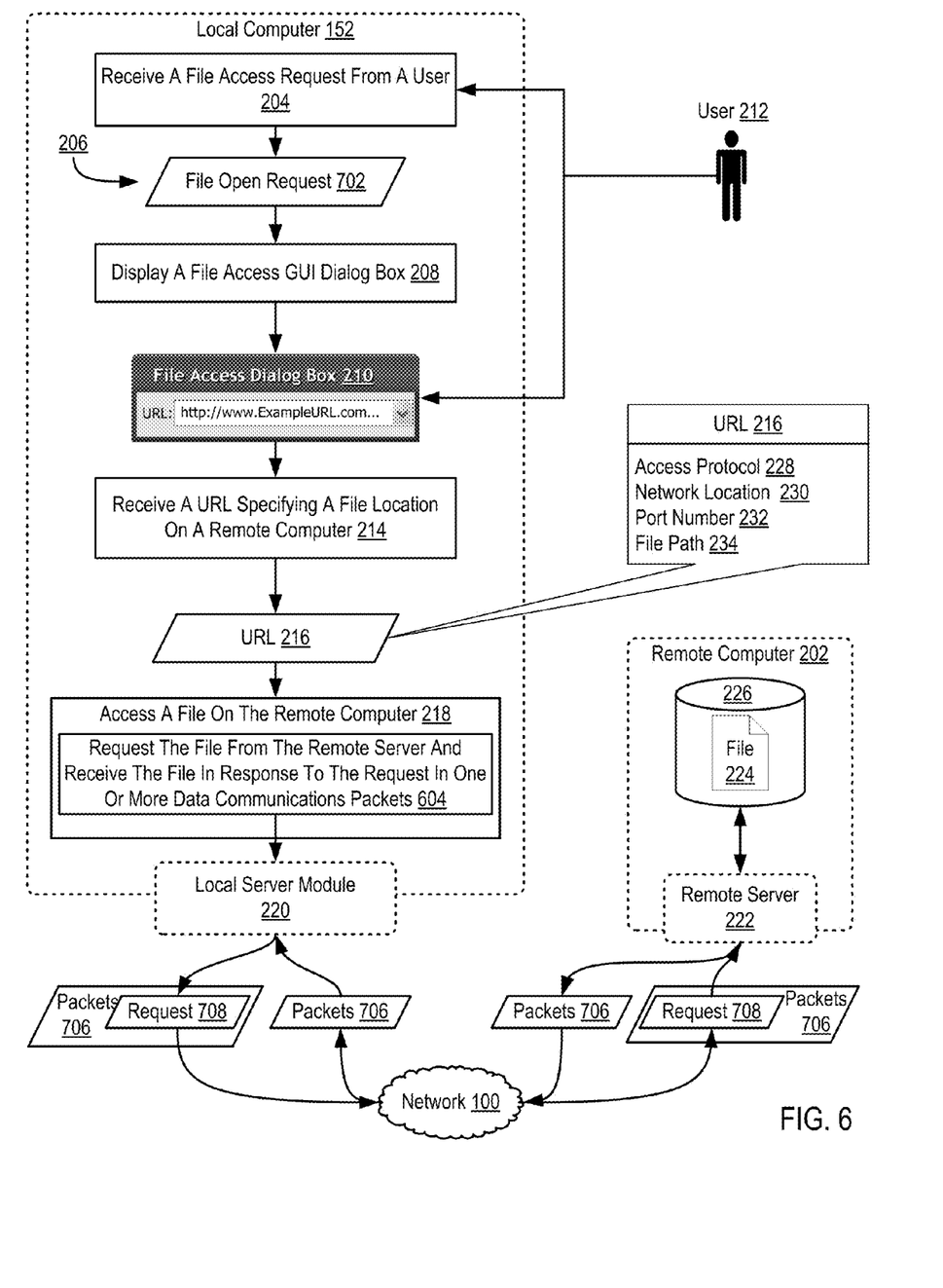
FIG. 6 sets forth a flow chart illustrating a further exemplary method for dynamically providing access to files of presently unmapped remote computers according to embodiments of the present invention.

For further explanation, FIG. 6 sets forth a flow chart illustrating a further exemplary method for dynamically providing access to files of presently unmapped remote computers according to embodiments of the present invention. The method of FIG. 6 is similar to the method of FIG. 2 in that the method of FIG. 6 includes displaying (208) a file access GUI dialog box (210); receiving (214), from the user (212) through the file access GUI dialog box (210), a URL (216) specifying a file location (226) on a remote computer (202); and accessing (218), in dependence upon the URL (216), a file (224) on the remote computer (202). The method of FIG. 6 differs from the method of FIG. 2, however in that in the method of FIG. 6, the file access request (206) is a request (702) to open a file stored on the remote computer (202) and accessing (218) a file (224) on the remote computer (202) includes requesting (604), by the local server module (220), the file (224) from the remote server (222) running on the remote computer (202) and receiving the file (224) in response to the request (708) in one or more data communications packets (706).

Requesting (604) the file (224) from the remote server (222) running on the remote computer (202) and receiving the file (224) in response to the request (708) may be carried out by in various ways in dependence upon the particular access protocol specified in the URL. Consider, for example, a request (708) implemented as an HTTP GET message that includes the GET D:\ExampleFilePath\Filename.txt. Where D:\ExampleFilePath\Filename.txt is the file path of the file to open on the local computer.

Figure 7:
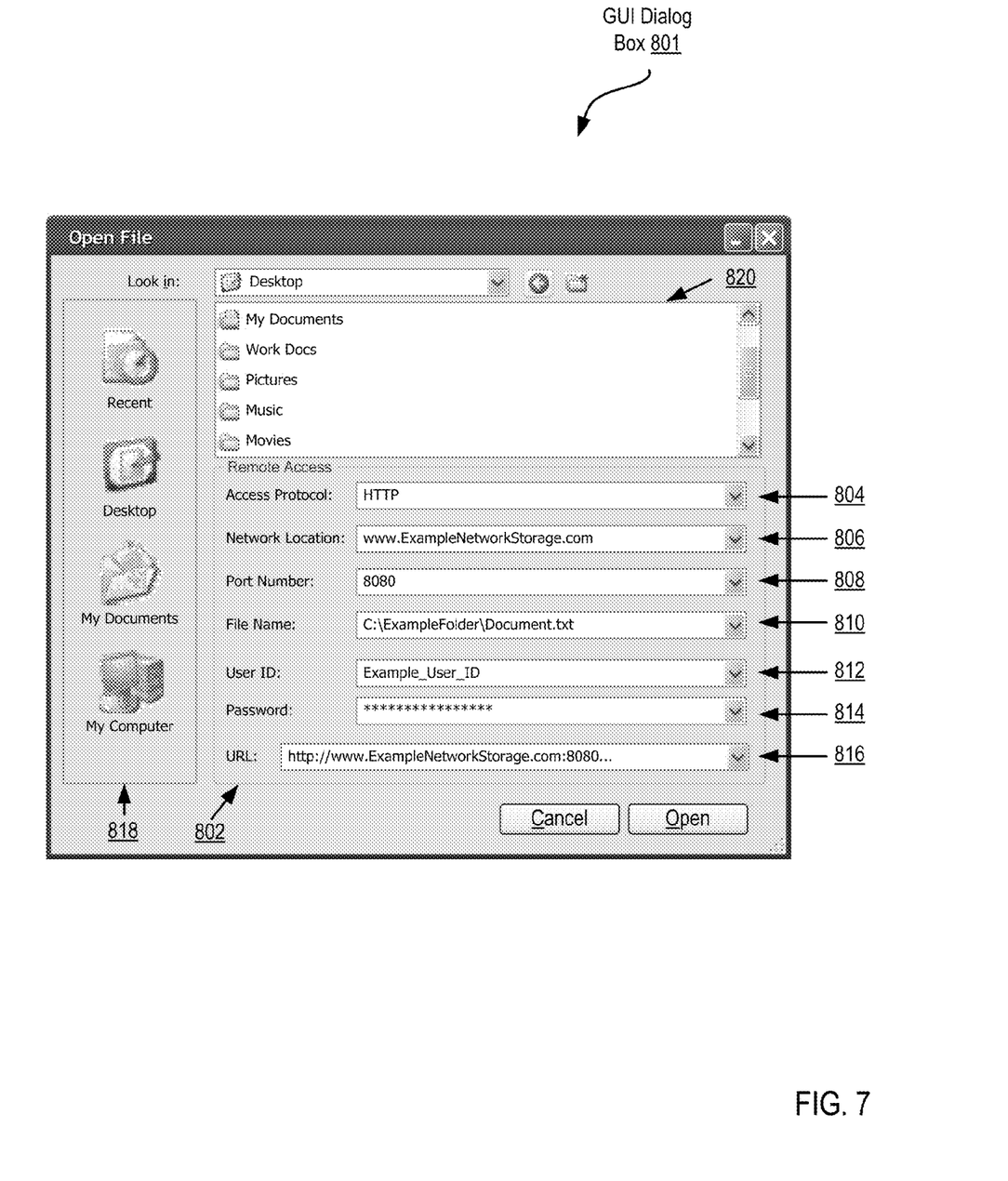
FIG. 7 sets forth an exemplary file access GUI dialog box displayed to a user for dynamically providing access to files of presently unmapped remote computers according to embodiments of the present invention.

For further explanation, FIG. 7 sets forth an exemplary file access GUI dialog box displayed to a user for dynamically providing access to files of presently unmapped remote computers according to embodiments of the present invention. The example file access GUI dialog box (801) of FIG. 7 is depicted as an "Open File" file access GUI dialog box for clarity of explanation, but readers of skill in the art will recognize that other types of file access GUI dialog boxes may be displayed to a user for similar purposes according to embodiments of the present invention including, for example, a "Save File" GUI dialog box. The GUI dialog box (801) in the example of FIG. 7 may be displayed upon a user selecting from a drop down menu an option to open a file. The GUI dialog box enables a user to select a file from local computer memory through icons (818) representing commonly and recently selected memory locations of files and through a list (820) of directories, subdirectories, and files. The set of icons (818) in the example of FIG. 1 include the 'Recent' icon which when selected lists recently accessed files, the 'Desktop' icon which when selected lists subdirectories and files located in the desktop directory, the 'My Documents' icon which when selected lists files and subdirectories of a directory typically used to store word processing documents, and the 'My Computer' icon that when selected displays the computer's hard drives, mapped network drives, optical drives, removable storage, and peripheral I/O devices, each of which is capable of containing files.

In addition to local files, the GUI dialog box (801) also enables a user to access files on a remote computer. A remote access portion (802) of the GUID dialog box (801) includes several drop down lists for specifying a file location on a remote computer. A user may insert text into the drop down lists, select a predefined item from the drop down list, or select a previously inserted item from the drop down list. A user may specify a file location on a remote computer in two different ways using the example GUI dialog box (801) of FIG. 7. In the example of FIG. 7 the user has specified an access protocol, HTTP, in the Access Protocol drop down list (804), specified a network location, the domain name www.ExampleNetworkStorage.com, in the Network Location drop down list (806), specified a port number, 8080, in the Port Number drop down list (808), specified a file path, C:\ExampleFolder\Document.txt, in the File Name drop down list (810), and specified authorization credentials including a user identification, Example_User_ID, and password, in the User ID drop down list (812) and Password drop down list (814). The application displaying the GUI dialog box may be coded to form a URL in dependence upon the parameters inserted into these drop down lists and display the formed URL in the URL drop down list (816). As an alternative to specifying each portion of the URL in separate drop down lists, a user may specify the entire URL in the URL drop down list (816), select a predefined URL from the URL drop down list (816), or select a previously entered URL from the URL drop down list (816).

Exemplary embodiments of the present invention are described largely in the context of a fully functional computer system for dynamically providing access to files of presently unmapped remote computers. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of dynamically providing access to files of presently unmapped remote computers, the method comprising:
   responsive to receiving a file access request from a user, displaying a file access Graphical User Interface ('GUI') dialog box;
   receiving, from the user through the file access GUI dialog box, Uniform Resource Locator (URL) formation parameters, wherein receiving URL formation parameters includes receiving an access protocol select ion specifying an access protocol to use in connection to an unmapped remote computer, a network location of the unmapped remote computer, a port number, and a file system path;
   forming a URL in dependence upon the URL formation parameters specifying an access protocol to use in connection to the unmapped remote computer, the network location of the unmapped remote computer, the port number, and the system path; and
   accessing, by a local user leveled editing application in dependence upon the URL, a file on the unmapped remote computer at the file system path through data communications established between a local server module and a remote server running on the unmapped remote computer using the particular access protocol, the network location of the unmapped remote computer, and the port number, wherein accessing the file on the unmapped remote computer comprises editing the file on the unmapped remote computer by the local user level editing application, wherein the local user level editing application uses the received URL, transparently to the user, to send the edited file to the unmapped remote computer for storage.

2. The method of claim 1 wherein accessing a file on the unmapped remote computer further comprises:
   accessing the file through data communications carried out according to the Transmission Control Protocol and Internet Protocol ('TCP/IP') among the local server module and the remote server running on the unmapped remote computer.

3. The method of claim 1 wherein accessing a file on the unmapped remote computer further comprises:
   requesting, from the user, authorization credentials;
   receiving the authorization credentials from the user; and
   providing, by the local server module, the authorization credentials to the remote server running on the unmapped remote computer.

4. The method of claim 1 wherein accessing a file on the unmapped remote computer further comprises:
   providing, by the local server module, an authentication certificate to the remote server running on the unmapped remote computer.

5. The method of claim 1 wherein:
   the file access request further comprises a request for access to save a file on the unmapped remote computer; and
   accessing a file on the unmapped remote computer further comprises sending the file by the local server module in one or more data communications packets to the remote server running on the unmapped remote computer for storage at the file system path specified in the URL.

6. The method of claim 1 wherein:
   the file access request further comprises a request to open a file stored on the unmapped remote computer; and
   accessing the file on the unmapped remote computer further comprises requesting, by the local server module, the file from the remote server running on the unmapped remote computer and receiving the file in response to the request in one or more data communications packets.

7. The method of claim 1 wherein the local server module comprises a software component of the local user level application.

8. The method of claim 7 wherein the local user level application further comprises one of a word processing application, a presentation development application, or a spreadsheet application.

9. An apparatus for dynamically providing access to files of presently unmapped remote computers, the apparatus comprising a computer processor, a computer memory operatively coupled to the computer processor, the computer memory having disposed within it computer program instructions that when executed by the computer processor cause the apparatus to carry out the steps of:
   responsive to receiving a the access request from a user, displaying a the access Graphical User Interface ('GUI') dialog box;
   receiving, from the user through the file access GUI dialog box, Uniform Resource Locator (URL) Formation parameters, wherein receiving URL formation parameters includes receiving an access protocol selection specifying an access protocol to use in connection to an unmapped remote computer, a network location of the unmapped remote computer, a port number, and a the system path;

forming a URL in dependence upon the URL formation parameters specifying an access protocol to use in connection to the unmapped remote computer, the network location of the unmapped remote computer, the port number, and the system path; and accessing, by a local user level editing application in dependence upon the URL, a file on the unmapped remote computer at the file system path through data communications established between a local server module and a remote server running on the unmapped remote computer using the particular access protocol, the network location of the unmapped remote computer, and the port number, wherein accessing the file on the unmapped remote computer comprises editing the file on the unmapped remote computer by the local user level editing application, wherein the local user level editing application uses the received URL, transparently to the user, to send the edited file to the unmapped remote computer for storage.

10. The apparatus of claim 9 wherein accessing a file on the unmapped remote computer further comprises:

accessing the file through data communications carried out according to the Transmission Control Protocol and Internet Protocol ('TCP/IP') among the local server module and the remote server running on the unmapped remote computer.

11. The apparatus of claim 9 wherein accessing a file on the unmapped remote computer further comprises:

requesting, from the user, authorization credentials;
receiving the authorization credentials from the user; and
providing, by the local server module, the authorization credentials to the remote server running on the unmapped remote computer.

12. The apparatus of claim 9 wherein accessing a file on the unmapped remote computer further comprises:

providing, by the local server module, an authentication certificate to the remote server running on the unmapped remote computer.

13. The apparatus of claim 9 wherein:

the file access request further comprises a request for access to save a file on the unmapped remote computer; and accessing a file on the unmapped remote computer further comprises sending the file by the local server module in one or more data communications packets to the remote server running on the unmapped remote computer for storage at the file system path specified in the URL.

14. The apparatus of claim 9 wherein:

the file access request further comprises a request to open a file stored on the unmapped remote computer; and accessing the file on the unmapped remote computer further comprises requesting, by the local server module, the file from the remote server running on the unmapped remote computer and receiving the file in response to the request in one or more data communications packets.

15. A computer program product for dynamically providing access to files of presently unmapped remote computers, the computer program product disposed in a computer readable recordable medium, wherein the computer readable recordable medium is not a signal, the computer program product comprising computer program instructions that when executed by a computer cause the computer to carry out the steps of:

responsive to receiving a file access request from a user, displaying a file access Graphical User Interface ('GUI') dialog box;

responsive to receiving a file access request from a user, displaying a file access Graphical User Interface ('GUI') dialog box;

receiving, from the user through the file access GUI dialog box, Uniform Resource Locator (URL) formation parameters, wherein receiving URL formation parameters includes receiving an access protocol selection specifying an access protocol to use in connection to an unmapped remote computer, a network location of the unmapped remote computer, a port number, and a file system path;

forming a URL in dependence upon the URL formation parameters specifying an access protocol to use in connection to the unmapped remote computer, the network location of the unmapped remote computer, the port number, and the file system path; and accessing, by a local user level editing application in dependence upon the URL, a file on the unmapped remote computer at the file system path through data communication established between a local sever module and a remote server running on the unmapped remote computer using the particular access protocol, the network location of the unmapped remote computer, and the port number, wherein accessing the file on the unmapped remote computer comprises editing the file on the unmapped remote computer by the local user level editing application, wherein the local user level editing application uses the received URL, transparently to the user, to send the edited file on the unmapped remote computer for storage.

16. The computer program product of claim 15 wherein accessing a file on the unmapped remote computer further comprises:

accessing the file through data communications carried out according to the Transmission Control Protocol and Internet Protocol ('TCP/IP') among the local server module and the remote server running on the unmapped remote computer.

17. The computer program product of claim 15 wherein accessing a file on the unmapped remote computer further comprises:

requesting, from the user, authorization credentials;
receiving the authorization credentials from the user; and
providing, by the local server module, the authorization credentials to the remote server running on the unmapped remote computer.

18. The computer program product of claim 15 wherein accessing a file on the unmapped remote computer further comprises:

providing, by the local server module, an authentication certificate to the remote server running on the unmapped remote computer.

19. The computer program product of claim 15 wherein:

the file access request further comprises a request for access to save a file on the unmapped remote computer; and accessing a file on the unmapped remote computer further comprises sending the file by the local server module in one or more data communications packets to the remote server running on the unmapped remote computer for storage at the file system path specified in the URL.

20. The computer program product of claim 15 wherein:

the file access request further comprises a request to open a file stored on the unmapped remote computer; and accessing the file on the unmapped remote computer further comprises requesting, by the local server module, the file from the remote server running on the unmapped remote computer and receiving the file in response to the request in one or more data communications packets.

\* \* \* \* \*